W. W. SYKES.
SAFETY DEVICE FOR THROTTLES.
APPLICATION FILED MAR. 26, 1921.
1,392,537.
Patented Oct. 4, 1921.
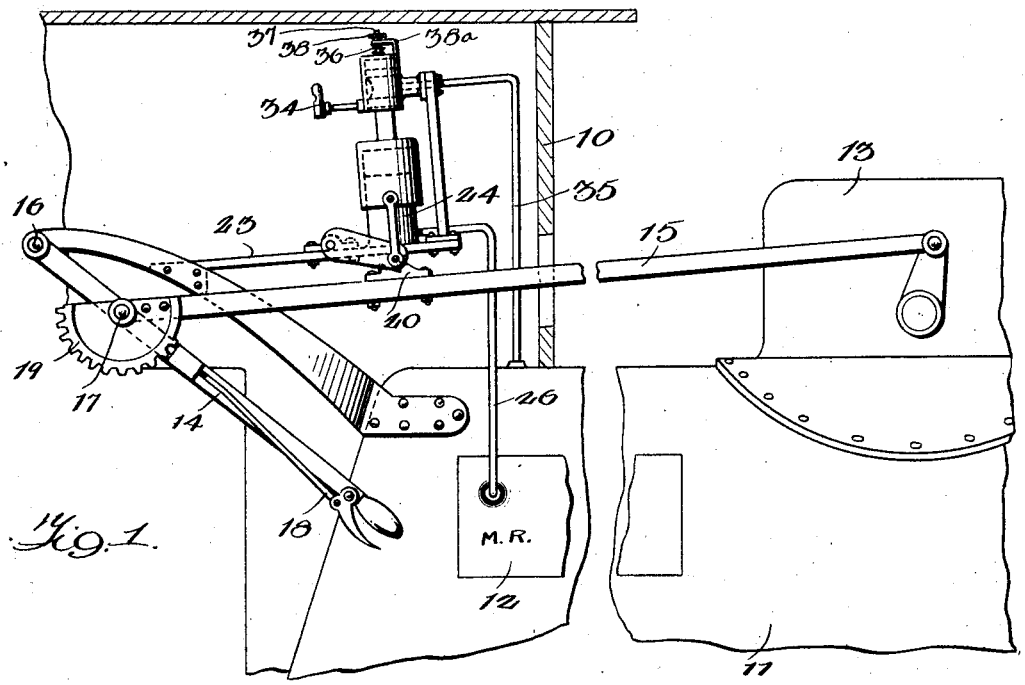
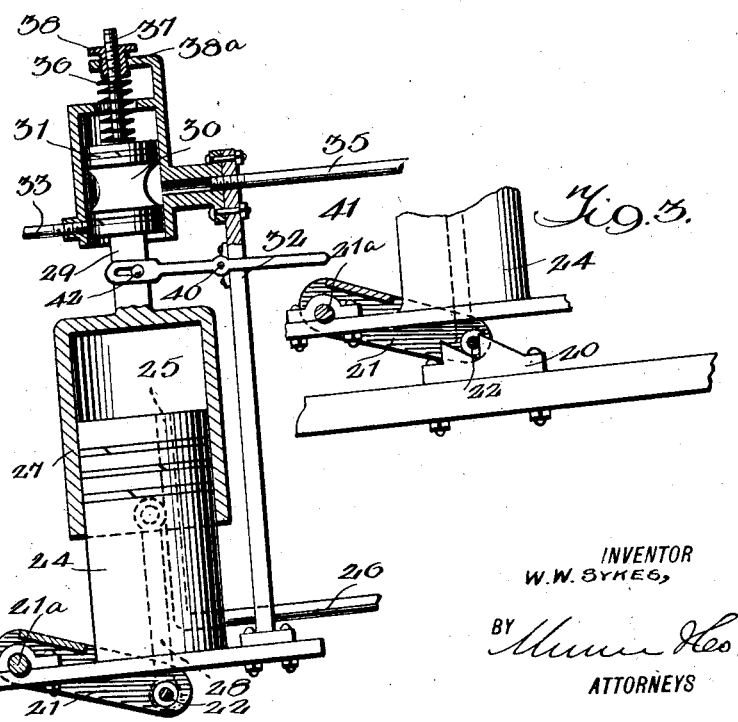
WITNESSES
INVENTOR
W. W. SYKES,
BY
ATTORNEYS

UNITED STATES PATENT OFFICE.

WILLIAM WHITE SYKES, OF SOUTH RICHMOND, VIRGINIA.

SAFETY DEVICE FOR THROTTLES.

1,392,537.   Specification of Letters Patent.   Patented Oct. 4, 1921.

Application filed March 26, 1921. Serial No. 455,888.

*To all whom it may concern:*

Be it known that I, WILLIAM WHITE SYKES, a citizen of the United States, and a resident of South Richmond, in the county of Chesterfield and State of Virginia, have invented certain new and useful Improvements in Safety Devices for Throttles, of which the following is a specification.

My present invention relates generally to safety devices for throttles, and more particularly to a safety device applicable to moving vehicles employing air brakes, my object being the provision of means whereby the operator will be notified when the pressure in the main reservoir of the air brakes falls below the required pressure for proper running.

My invention more particularly aims at the provision of means which will positively signal the operator of the locomotive or other moving device, both when the vehicle is in motion and when it is stationary.

In the construction of the invention as I propose at the present time, an audible signal is sounded while the locomotive is in motion and the engineer is of course at hand and easily within hearing distance, and means are provided whereby the throttle lever is locked against opening movement in case the locomotive is stationary and the engineer absent from the cab. These details may however be varied to some extent as I will hereinafter describe in connection with the construction and operation of the invention shown in the accompanying drawing, which latter forms a part of this specification and wherein, Figure 1 is a sectional side view illustrating the practical application of my invention, Fig. 2 is a vertical sectional view through certain parts thereof, and Fig. 3 is a fragmentary sectional view.

Referring now to these figures I have shown portions of a locomotive cab at 10, the boiler being indicated at 11, the main reservoir at 12, the steam dome at 13 and the throttle lever and throttle arm respectively at 14 and 15. This lever 14, pivoted at 16, has a pivotal connection intermediate its ends at 17, with one end of the throttle arm 15 and has a latch mechanism 18 engaging a notched quadrant 19 carried by the throttle arm, the latter being provided in accordance with my invention with a notched locking piece 20 secured thereon intermediate its ends for movement therewith beneath a locking lever 21 having at one end a cross piece 22 which is movable with the lever downwardly into locking engagement with the piece 20 when the throttle lever 14 is in the closed position shown in Fig. 1, at which time the locking piece 20 is positioned to receive the cross bar.

The locking lever 21 is pivoted at $21^a$ upon a bracket 23 which is rigidly supported in the cab 10 and which also supports a rigid upright piston 24 having an aperture 25 opening at one end through the top of the piston and receiving at its opposite end one end of a pipe 26 connecting the same with the main reservoir 12. Over this piston 24 a vertically movable cylinder 27 telescopes, the lower side portions of which are connected by depending links 28 with the free end of the locking lever 21, and the upper closed end of which cylinder has an upright stem 29 supporting a piston valve 30. This piston valve operates in the cylinder 31 rigidly carried upon an upright 32 upstanding from the bracket 23 and having a pipe 33 leading therefrom to a signal whistle 34.

In the normal position of the parts, the cylinder 27 is held in its uppermost position by the air pressure from the main reservoir 12 through pipe 26, the piston valve 30 at this time covering the inner end of the whistle pipe 33, and lever 21 being held upwardly free of engagement with the locking piece 20 as seen in Fig. 1. There also communicates with the piston valve cylinder 31 a steam pipe 35, leading from the boiler 11, whose function is to supply steam pressure for sounding the whistle 34 when the piston valve 30 has lowered to an extent sufficient to uncover the inner end of the whistle pipe 33.

Before this movement takes place however and the whistle is sounded it is necessary that the locking piece 20 be out of position below the locking member 21. This occurs for instance when the locomotive is running with the throttle open at least to some extent so that enough downward movement of the cylinder 27 is permitted to accomplish the opening of the whistle pipe. At this time, that is when the locomotive is running, the engineer is of course within his cab and within hearing distance of the whistle so that when the latter sounds the engineer is at once acquainted with the fact that the pressure in the main reservoir 12 is below the safety point. The engineer is thereupon faced with the duty of locating what trouble there is if any in order that the pressure may be built up.

Downward movement of the cylinder 27 which is normally prevented by the pressure of the main reservoir in the space between the upper end of the cylinder and the upper end of the piston 24 is accomplished when this pressure falls, by a spring 36 coiled around a stem 37 projecting upwardly from the piston valve 30 and which is compressed between the upper end of this valve and a spring adjusting member 38 threaded and vertically adjustable in a bracket 38ª upstanding from the piston valve cylinder 31. The stem 37 is guided and movable through an opening in the said spring adjusting member 38.

When the locomotive is stationary and the throttle lever 14 is closed, the locking piece 20 is positioned beneath the locking lever 21 and if, when the parts are in this position, the pressure of the main reservoir falls below the safety point, and cylinder 27 drops accordingly, the locking lever 21 engages the locking piece 20 and serves to prevent sufficient downward movement of the piston valve to uncover the inner end of the whistle pipe 33. It is quite obvious that if the whistle were sounded under these circumstances it would be ineffective in the event the engineer is away from the locomotive and that an undesirable escape of steam from the boiler would result. Hence under the circumstances last stated the parts move simply for the purpose of locking the throttle arm 15 so that when the engineer returns to his cab and finds in attempting to open the throttle that the latter is locked, the fact that the main reservoir pressure is below the safety point is conveyed to him in this way.

The device proposed by my invention is thus adapted to effectively operate along the intended lines and for the intended purposes and to accomplish the results sought for, and is at the same time simple, comparatively inexpensive, will take up little space, and is lasting and durable.

It is of course to be understood that the parts, even when locked, may be readily shifted to permit of operation of the throttle and that the locking of the latter is more in the nature of a signal or temporary lock than an actual or permanent preventive of operation. Many situations may require movement of an engine in spite of the absence of proper brake applying pressure. For instance, fire in the roundhouse or other danger to a locomotive when standing may render its movement essential, and to facilitate release of the throttle lever, the upright 32 may support the fulcrum 40 of a hand lever 41, one end of which is pivotally connected at 42 to the stem 29 so that by manually depressing the free end of lever 41, the cylinder 27 may be raised, thus lifting the locking lever 21 to released position.

I claim:

1. The combination with a self-propelled vehicle having a throttle and an air brake apparatus including a main reservoir, of signal means for indicating a fall of pressure in the main reservoir below the safety point, said means being normally controlled by the pressure in the said reservoir and including elements operable in conjunction with the throttle when the latter is closed and elements operable independent of the throttle when the latter is open.

2. The combination with a self-propelled vehicle having a throttle and an air brake apparatus including a main reservoir, of signal means for indicating a fall of pressure in the main reservoir below the safety point, said means being normally controlled by the pressure in the said reservoir and including elements operating mechanically to lock the throttle when the latter is closed and other elements for sounding an alarm when the throttle is open.

3. The combination with a movable vehicle having a throttle and an air brake apparatus including a main reservoir, of a locking piece shiftable with the throttle and a locking lever normally controlled by pressure of the main reservoir and movable into locking engagement with the throttle carried locking piece when the pressure of the main reservoir falls below the safety point.

4. The combination with a movable vehicle having a controlling throttle and an air brake apparatus including a main reservoir, automatically shiftable means normally controlled by the pressure of the main reservoir and movable upon fall of said pressure below the safety point into locking engagement with the throttle when the latter is in closed position, an audible signal, and means controlled by said shiftable member for sounding said audible signal, said last named means being inactive when the throttle is in closed position.

5. The combination with a movable vehicle having a controlling throttle and an air brake apparatus including a main reservoir, of an audible signal, means to sound the same, means to normally render the signal inactive including a member normally controlled by pressure of the main reservoir, a locking lever shiftable with said member, and a locking piece movable with the throttle and interposed in the path of movement of said locking lever when the throttle is in closed position.

WILLIAM WHITE SYKES.